Patented Dec. 22, 1931

1,837,283

UNITED STATES PATENT OFFICE

BEVERLY OBER AND EDWARD H. WIGHT, OF BALTIMORE, MARYLAND, ASSIGNORS, BY MESNE ASSIGNMENTS, TO THE OBERPHOS COMPANY, OF BALTIMORE, MARYLAND, A CORPORATION OF MARYLAND

PROCESS FOR MANUFACTURING ACID PHOSPHATE

No Drawing.   Application filed May 29, 1926. Serial No. 112,678.

This invention relates to the manufacture of acid phosphate particularly, but not necessarily restrictedly, for use as a fertilizer.

In the usual process of manufacturing acid phosphate, ground phosphate rock is treated with strong sulphuric acid, the resulting sludgy mass is run into a den and allowed to remain there for a few hours. This product is then removed from the den and deposited in the curing chamber where it is allowed to remain until cured and dry.

Such processes present many disadvantages and undesirable features. A great deal of time is consumed in the curing process which is commercially disadvantageous.

It is an object of this invention to decrease the time required for the manufacture of acid phosphate.

Another object is to provide a process for acid phosphate manufacture which will require but few mechanical elements to carry it out.

A further object is to eliminate substantial losses by insuring a complete reaction of all of the phosphate raw material and acid.

Another object is to put a vacuum on the dust before entry of the acid, which vacuum removes all occluded air and moisture if any, together with all foreign gases which have a tendency to delay the penetration of the acid through the dust.

We accomplish these and other important objects by acidulating a batch of finely ground phosphate rock under reduced pressure of air or other gases until reaction pressures have built up. The fundamental conception of this invention may be effectuated by a number of specific processes utilizing various apparatuses.

As before intimated, it has been the practice to run insoluble phosphate and an acid into a mixing machine. Such machines are provided with a stirring mechanism which mixes the acid and rock. This stirring operation, however, does not mix the acid and rock components thoroughly and as a result there remains in the mass small nodules of rock dust. These nodules of dust may pass through the entire process without being converted to an available form of phophate and hence the product, the value of which depends on the percentage of agriculturally available phosphate, is rendered less desirable.

We propose to admit the phosphatic dust, ground to a suitable degree of fineness, to a pressure-tight container and after sealing it to reduce the pressure therein. This may be done by providing the container with a suitable draw-off line connected to a vacuum pump. This line may be, and preferably is, provided with a valve interposed between the container and the pump which may be closed when the desired vacuum is obtained in the container. By reducing the pressure in the container, it will be appreciated that the rock dust will be quickly evacuated and all air and other gases, together with any moisture, will be drawn off through the line. The ground rock being thus evacuated, the subsequent reaction between it and the acid is greatly accelerated by reason of the quick penetration of the acid. Furthermore this method of procedure tends to prevent the formation of nodules of unattacked phosphate rock and thereby insures a product with a much greater percentage of available phosphate than could be obtained heretofore.

After the pressure has been reduced an acid, such as suphuric acid, is admitted through suitable pipes or openings and sprayed over the rock dust or injected into the chamber and then mixed thoroughly with it by any suitable means, which mixing is greatly accelerated by the vacuum. Mixing may be accomplished in any desired way, such as by mounting the stirring mechanism on the cover of the autoclave or by mounting the autoclave itself for rotation. It may be desirable to use both means. It is to be understood that various mechanisms may be utilized to carry out the essential features of this invention and hence we do not intend to be restricted to any particular apparatus.

We have found that the success of this process does not depend upon the use of sulphuric acid as such. A very desirable product has been obtained by first treating the rock as hereinbefore described, that is to say by setting up a partial vacuum in the container to which the rock has been admitted and then admitting the constituents or the component compounds from which the acid may be formed in the container. It must be borne in mind that sufficient excess water must be admitted either with the pre-formed acid or with the last mentioned component compound to insure sufficient water for crystallization. The partial vacuum in the container acts as a reverse pressure and insures a rapid injection of the fluids in the container and hence no pump need be used to force the materials into the autoclave.

We have found in addition that the reaction may be further accelerated by heating the container after the components of the mix have been admitted. The amount of heat applied will, of course, vary with different types of the phosphatic raw material, for certain side reactions may supply much of the requisite heat, as for instance the exothermic reaction of sulphuric acid on the carbonate impurities in the rock. These factors may be readily determined by test of samples of the various grades of the raw material.

We do not intend to be limited to any statement of the reactions occurring in the autoclave, either of the sulphuric acid or other acid and rock or any material used. We have found that if conditions are adjusted as described above, a very desirable product having a high percentage of agriculturally available phosphate is obtained.

The constituents to form the acid used may be obtained in any desired manner, such as in the case of sulphuric acid by reaction between sulphur dioxide and oxygen catalyzed by platinized asbestos. The same results may be obtained by burning sulphur and nitre and injecting the resulting vapors, for example nitrosylsulphuric, and water into the container.

During the mixture of sulphuric acid and phosphatic rock, the pressure in the container is gradually increased by the gases and vapors generated. This increase in pressure when released causes a quick drop in temperature and operates to crystallize the resultant mass with great speed. Due to the rapid digestion of the product and thorough penetration of the acid because of the original vacuum, as well as the subsequent heat and pressure, the resulting product is in shape for final drying. This has been accomplished by putting the same container under vacuum and reducing the product to a moisture content such that it is ready for grinding and shipment. This second vacuum gives a second quick drop in temperature which further helps the crystallization.

It will be seen that we have provided a process in which substantially all the separate stages of acid phosphate manufacture have been condensed in one. The finely ground raw material is placed in a container. In this container the ground rock is evacuated, mixed with acid or the constituents thereof, allowed to react therein and finally crystallized and dried. By adjusting the heat and pressure conditions all of these essential steps, which heretofore required separate apparatuses, may be carried out by my improved process in one apparatus. Besides eliminating many elements heretofore deemed necessary, we have accomplished a further advantage in producing a final product that is of great uniformity, particularly with respect to its moisture content.

Although there is described a suggested apparatus for carrying the invention into effect, it is to be understood that it is not my intention to be necessarily limited thereto in an interpretation of the claims, as mechanical adaptations within the limits of the claims can be made without departing from the nature or scope of the invention.

We claim:

1. A process for manufacturing acid phosphate comprising subjecting phosphate rock dust in a confined space to a reduced pressure, admitting a strong mineral acid to the confined space while maintained under a reduced pressure, and digesting the mixture of phosphate rock dust and the strong mineral acid under controlled superatmospheric pressure and temperature while agitating the mass to produce available phosphatic salts.

2. A process for manufacturing phosphate fertilizer comprising mixing phosphate rock dust and a strong mineral acid in a confined space under a partial vacuum, digesting the mixture in the confined space under superatmospheric pressure while mechanically agitating the mass, for a time sufficient to insure substantial conversion of the unavailable phosphate into available forms.

3. A process for manufacturing phosphate fertilizer comprising mixing phosphate rock dust and a strong mineral acid in a confined space under a partial vacuum, digesting the mixture in the confined space under superatmospheric pressure while mechanically agitating the mass, for a time sufficient to insure substantial conversion of the unavailable phosphate into available forms, and subsequently decreasing the pressure in the confined space to effect crystallization of the reaction products and drying thereof.

4. A process for manufacturing phosphate fertilizer comprising mixing phosphate rock dust and a strong mineral acid in a confined space under a partial vacuum, digesting the mixture in the confined space under superatmospheric pressure while mechanically agitating the mass and while applying heat to the mass in the confined space for a time sufficient to insure substantial conversion of the unavailable phosphate into available forms.

5. A process for manufacturing acid phosphate comprising acidulating phosphate rock dust in a substantially deaerated confined space, digesting the mixture in the confined spaced under superatmospheric autogenous pressure to the exclusion of air while applying heat to the mass, and mechanically agitating the mass.

6. A process for manufacturing acid phosphate comprising acidulating phosphate rock dust in a substantially deaerated confined space, digesting the mixture in the confined spaced under superatmospheric autogenous pressure to the exclusion of air while applying heat to the mass, and mechanically agitating the mass, and subsequently decreasing the pressure on the mass in the confined space to effect drying of the solid products of conversion.

7. A process of manufacturing acid phosphate comprising subjecting phosphate rock dust in a confined space to a reduced pressure to de-aerate the space, admitting an acidulating agent to the confined space while de-aerated, applying heat to the material in the confined space while excluding air, to effect conversion of the phosphate rock dust under superatmospheric pressure into an available phosphate fertilizer, decreasing the pressure in the confined space after substantial conversion of the phosphate rock dust into an available phosphatic fertilizer, and subsequently applying a partial vacuum to the material in the confined space to effect crystallization.

8. A process of manufacturing superphosphate comprising mixing phosphate rock dust, sulphur trioxide and water in a confined space under a partial vacuum, digesting the mixture in the confined space under superatmospheric pressure, while mechanically agitating the mass for a period of time sufficient to effect substantial conversion of the unavailable phosphate into available forms.

In testimony whereof we affix our signatures.

BEVERLY OBER.
EDWARD H. WIGHT.